(12) United States Patent
Chamaret et al.

(10) Patent No.: US 8,891,016 B2
(45) Date of Patent: Nov. 18, 2014

(54) METHOD FOR REFRAMING IMAGES OF A VIDEO SEQUENCE, AND APPARATUS FOR REFRAMING IMAGES OF A VIDEO SEQUENCE

(71) Applicant: Thomson Licensing, Issy de Moulineaux (FR)

(72) Inventors: Christel Chamaret, Chantepie (FR); Fabrice Urban, Thorigne Fouillard (FR); Christophe Chevance, Brece (FR)

(73) Assignee: Thomson Licensing, Issy les Moulineax (FR)

( * ) Notice: Subject to any disclaimer, the term of this patent is extended or adjusted under 35 U.S.C. 154(b) by 0 days.

(21) Appl. No.: 13/928,146

(22) Filed: Jun. 26, 2013

(65) Prior Publication Data

US 2014/0002742 A1    Jan. 2, 2014

(30) Foreign Application Priority Data

Jun. 29, 2012    (EP) .................................. 12305779

(51) Int. Cl.
| | |
|---|---|
| H04N 5/14 | (2006.01) |
| H04N 9/74 | (2006.01) |
| G06F 3/00 | (2006.01) |
| G06K 9/34 | (2006.01) |
| H04N 7/12 | (2006.01) |
| H04N 11/02 | (2006.01) |
| H04N 11/04 | (2006.01) |
| G06T 3/00 | (2006.01) |

(52) U.S. Cl.
CPC ................ H04N 5/14 (2013.01); G06T 3/0012 (2013.01)
USPC ........... 348/571; 348/581; 715/719; 715/722; 382/173; 375/240.24

(58) Field of Classification Search
CPC ............................. H04N 5/14; G06T 3/0012
See application file for complete search history.

(56) References Cited

U.S. PATENT DOCUMENTS

| | | | |
|---|---|---|---|
| 7,266,771 B1* | 9/2007 | Tow et al. ...................... | 715/719 |
| 8,442,318 B2* | 5/2013 | Knee et al. .................... | 382/173 |
| 2010/0245532 A1* | 9/2010 | Kurtz et al. ................ | 348/14.03 |
| 2014/0153651 A1* | 6/2014 | Urban et al. ............. | 375/240.24 |

FOREIGN PATENT DOCUMENTS

EP    1956550    8/2008

OTHER PUBLICATIONS

Chamaret et al. "How to measure the relevance of a retargeting approach", Workshop Media Retargeting in ECCV, Sep. 1, 2010, pp. 1-14.
Chamaret et al. "Attention-based video reframing: validation using eye-tracking" International Conference on Pattern Recognition, Dec. 8-11, 2008, pp. 1-4.
Search Report dated Dec. 7, 2012.

* cited by examiner

*Primary Examiner* — Jefferey Harold
*Assistant Examiner* — Sean Haiem
(74) *Attorney, Agent, or Firm* — Tutunjian & Bitetto, P.C.

(57) ABSTRACT

A reframing application crops a sub-part of a video source, based on its content. The reframing application involves a visual attention model that produces a saliency map, and a dedicated reframing algorithm that extrapolates a cropping window based on that saliency map. After cropping, only the reframed portion of each video image remains visible. A method for processing images of a video sequence comprises steps of determining parameters of the video sequence, parameters of a previously decoded subsequence of the video sequence and user settings, determining a portion to be cropped according to the determined parameters, and cropping in a reframing step the determined portion for being displayed. An advantage of the invention is that an advanced automatic solution is provided for tuning automatically the reframing parameters, based on the content of a video.

19 Claims, 4 Drawing Sheets

METHOD FOR REFRAMING IMAGES OF A VIDEO SEQUENCE, AND APPARATUS FOR REFRAMING IMAGES OF A VIDEO SEQUENCE

This application claims the benefit, under 35 U.S.C. §119 of European Patent Application 12305779.6, filed Jun. 29, 2012.

FIELD OF THE INVENTION

This invention relates to a method and an apparatus for processing images of a video sequence, and in particular for reframing images of a video sequence.

BACKGROUND

A reframing application, as known e.g. from EP 1 956 550 A, is initially designed to crop a sub-part of a video source based on its content. After cropping, only the reframed portion of each video image remains visible. The reframing application involves a visual attention model and a dedicated reframing algorithm. The visual attention model produces a saliency map, whereas the reframing algorithm extrapolates a cropping window based on that saliency map. This cropping window is variable in terms of location and size, depending on the video content. The reframing algorithm is complementary to an encoding or decoding process. Depending on a use case, the reframing application may be used differently. E.g., the reframing application can be used as a pre-processing before mobile video encoding. In another example, the reframing application is performed just after video decoding.

A problem is that currently there is no advanced or automatic solution available for tuning automatically the reframing parameters, based on the content of a video.

SUMMARY OF THE INVENTION

The present invention enables tuning automatically the settings or input parameters of the reframing application, by taking advantage of information that is available when decoding video source data. The disclosed solution for automatically tuning settings or input parameters for a decoded video sequence takes advantage of properties of a previously decoded sequence.

According to the invention, a method for processing images of a video sequence comprises steps of determining parameters of the video sequence, parameters of a previously decoded GOP (Group Of Pictures) of the video sequence and determining user settings, determining a portion to be cropped according to the determined parameters, and cropping the determined portion for being displayed.

Various parameters of the video sequence can be determined and utilized, such as a GOP size, a temporal subsampling factor, minimum and maximum zoom factors or a bounding box velocity. The parameters can be utilized separately or combined. E.g., in one embodiment, the determined and utilized parameters comprise (from the above-mentioned parameters) only a bounding box velocity.

In one embodiment, the determined and utilized parameters comprise a minimum and a maximum zoom factor.

In one embodiment, the determined and utilized parameters comprise a GOP size, a temporal subsampling factor, a minimum and a maximum zoom factor, and a bounding box velocity.

In one embodiment of the invention, a method for processing images of a video sequence comprises steps of determining in a previous image a sub-area or sub-set of pixels being the most salient portion of the previous image for being included in a reframed window, determining a first bounding box around said sub-area or sub-set of pixels, determining in a current image a sub-area or sub-set of pixels being the most salient portion of the current image for being included in a reframed window, and a second bounding box around said area, determining a maximum bounding box velocity for moving a bounding box between successive images, determining a new bounding box from the first and second bounding boxes and the determined maximum velocity of the bounding box, and cropping in the current image the sub-area according to the determined new bounding box for being displayed.

The maximum bounding box velocity may be determined from parameters of a previously decoded GOP of the video sequence. The maximum bounding box velocity may also be a predefined value retrievable from a register or storage, which is then also valid for previously decoded GOPs of the video sequence.

An apparatus that utilizes the method comprises image analysis means for determining parameters of the video sequence, determining parameters of a previously decoded GOP (Group Of Pictures) of the video sequence and determining user settings (e.g. user interface means), and image processing means for determining a portion to be cropped according to the determined parameters, and for cropping the determined portion for being displayed. Various parameters of the video sequence can be determined and utilized separately or combined, as described above.

In one embodiment of the invention, an apparatus for processing images of a video sequence comprises first salient portion determining means for determining in a previous image a sub-area or sub-set of pixels being the most salient portion of the previous image for being included in a reframed window, first bounding box determining means for determining a first bounding box around said sub-area or sub-set of pixels, second salient portion determining means for determining in a current image a sub-area or sub-set of pixels being the most salient portion of the current image for being included in a reframed window, and second bounding box determining means for determining a second bounding box around said most salient portion of the current image, bounding box velocity determining means for determining, from parameters of a previously decoded GOP of the video sequence, a maximum bounding box velocity for moving a bounding box between successive images, third bounding box determining means for determining a new bounding box from the first and second bounding boxes and the determined maximum velocity of the bounding box, and cropping means for cropping in the current image the sub-area according to the determined new bounding box for being displayed.

In one aspect, the invention relates to a computer readable medium having executable instructions stored thereon to cause a computer to perform a method as disclosed above. In one embodiment, the computer is caused to perform a method for processing images of a video sequence, comprising steps of determining parameters of the video sequence, determining parameters of a previously decoded GOP of the video sequence and determining user settings, determining a portion to be cropped according to the determined parameters, and cropping the determined portion for being displayed.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 the structure of a video decoder with reframing application, FIG. 2 a flow-chart of the method for processing images of a video sequence, FIG. 3 a diagram of the evolution of buffer size as a function of GOP size, FIG. 4 selection of an optimal temporal subsampling mode/factor regarding the computational context and real-time requirements, FIG. 5 a flow-chart of the mode selection regarding the GOP arrangement, size and environment constraints, FIG. 6 exemplary MB cost maps for I-frames at different bit rates, FIG. 7 a diagram of the evolution of bounding box velocity as a function of IntraMap correlation between frames for a complete GOP, FIG. 8 a diagram explaining limited bounding box velocity, FIG. 9 a diagram explaining limited bounding box zoom factor, and FIG. 10 the structure of an apparatus for processing images of a video sequence.

DETAILED DESCRIPTION OF THE INVENTION

Figure 1:
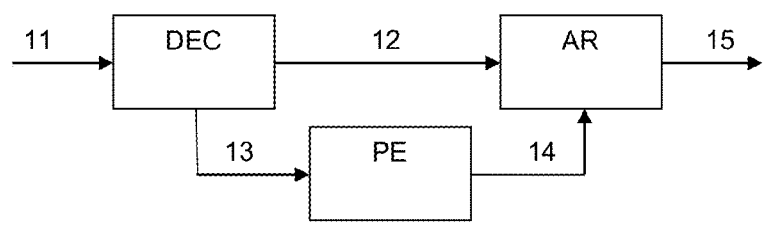

FIG. 1 shows the structure of a video decoder DEC with an automatic reframing unit AR. The decoder DEC receives an encoded input video sequence 11, and decodes it to obtain a decoded video sequence 12. A parameter extractor PE extracts parameters and/or reframing settings 14 from the decoded video sequence and/or the decoder settings 13. The automatic reframing unit AR generates, from the decoded video 12 and the extracted parameters and/or reframing settings 14, a reframed (i.e. cropped) video sequence 16.

A reframing application has a certain number of settings S that, according to the invention, are tuned automatically from the decoded stream or the decoding process. In one embodiment, the settings comprise a buffer size, a temporal subsampling factor, two zoom factors $z_{min}$ and $z_{max}$, and a bounding box velocity. The settings $s_1$, $s_2$, $s_3$, $s_4$ are described below.

$$S = (s_1, s_2, s_3, s_4)^T = \begin{pmatrix} \text{Buffer size} \\ \text{Temporal subsampling factor} \\ \text{zoom factors: } z_{min}, z_{max} \\ \text{Bounding box velocity} \end{pmatrix} \quad \text{(eq. 1)}$$

The Buffer size ($s_1$) is the size of the buffer that is used in the reframing process to smooth the cropping window parameters over time. In one embodiment, the buffer size is adjusted according to the GOP size.

The Temporal subsampling factor ($s_2$) is used to limit the number of frames to which the reframing process is applied, thus reducing and controlling the computational complexity of the application; e.g., apply the reframing process only to one frame over $s_2$, or one frame out of $s_2$ frames. In one embodiment, possible temporal subsampling factors/modes are "full mode" (all frames), "intermediary mode" (only I- and P-frames) and "light mode" (only I-frames), depending on GOP length and The Zoom factors ($s_3=(z_{min}, z_{max})$) defines the boundaries between which the cropping window may change over time. This limits changes in the size of the cropping window. The user may set this feature to avoid too big or too small zoom effects. In one embodiment, in the first picture after scene cut a MB cost map is created to find the most important blocks. Then the MB cost map is used to determine the zoom factor.

The Bounding box velocity ($s_4$) is the velocity with which the cropping window may move within the picture. The Bounding box refers, in one embodiment, to the sub-area or sub-set of pixels selected as being the most salient, which is to be included in a reframed window. The allowable velocity depends on the image content: it is limited to low values when a correlation between intra-predicted MBs of subsequent images is quite low or quite high; high correlation means static image or low motion, so that a stable bounding box position is preferable; low correlation means a scene change, which would overstrain the algorithm since it cannot be compensated by a bounding box shift. Thus, the Bounding box velocity $s_4$ may be adapted to the sequence to better fit the natural camera motion of the camera, depending on the content. In one embodiment, a Kalman filter is applied to the bounding box coordinates for filtering them, and the bounding box velocity is the noise factor that is injected in the Kalman filter.

Figure 2:
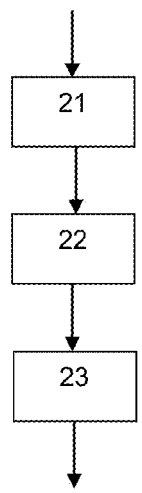

FIG. 2 shows a flow-chart of the method for processing images of a video sequence. The method comprises steps of determining 21 parameters of the video sequence, parameters of a previously decoded GOP (Group Of Pictures) of the video sequence and user settings, determining 22 a portion to be cropped according to the determined parameters, and cropping 23 the determined portion for being displayed.

In one embodiment, the decoding parameters are determined as follows.

The Buffer size $s_1$ is adjusted according to the GOP size (Gsize). In principle, the buffer size is reduced for small GOPs, while the full buffer $Size_{max}$ is used for GOP sizes above a certain limit. The GOP size is a predefined parameter that the decoder DEC may retrieve from a storage or extract from the encoded bitstream. The following rule may be applied:

$$s_1 = \begin{cases} Size_{max} & \text{if } Gsize \geq Gsize_{max} \\ \log_2(Gsize) + \dfrac{Gsize}{2} + 1 & \text{otherwise} \end{cases} \quad \text{(eq. 2)}$$

Figure 3:
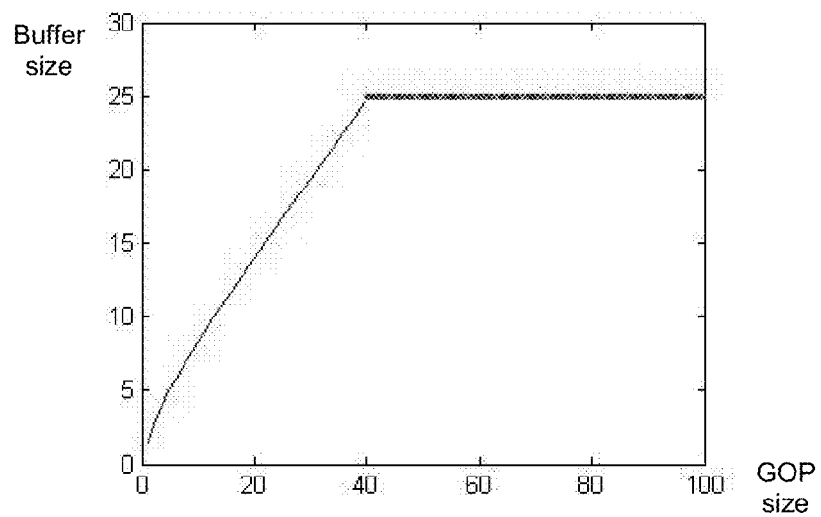

For an exemplary concrete application, $Gsize_{max}$ is set to 40 and $Size_{max}$ to 25. That is, the cropping window parameters of $Size_{max}$ previous frames are buffered and considered for obtaining cropping window parameters of a current frame, if the GOP size is 40 or more. In this way, sudden changes in cropping window parameters are avoided, so that the cropping window parameters are smoothed over time. Then, a curve for the buffer size results as depicted in FIG. 3.

The Temporal subsampling factor $s_2$ may be set according to the GOP size and scheme. The philosophy is to maintain the computation of the reframing process (and then of the saliency map) at least on I-frames, since they have the highest quality and may potentially be at the beginning of scene (i.e. just after scene cut). Then, the P-frames are less interesting to be processed. Finally, the B-frames would be the first frames to be omitted if there is any need for removing frames by temporal subsampling.

By using the GOP scheme, an improvement can even be made compared to the known solution of EP 1 956 550 A, because now it is possible to choose which frame type and which frames will be impacted.

Figure 4:
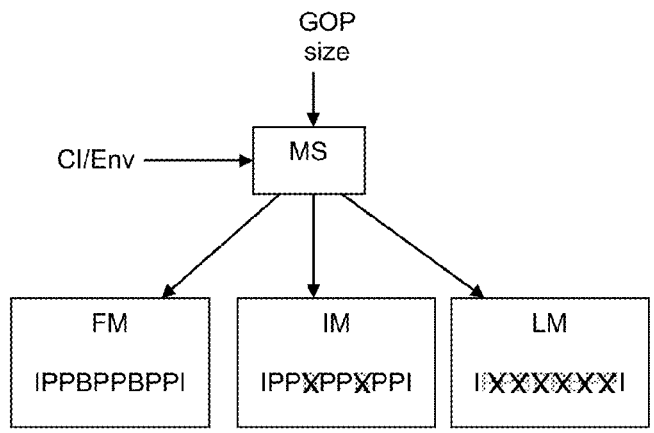

Then, instead of defining a factor, it is possible to define three modes or use cases, such as depicted in FIG. 4. In Full mode FM, there is no temporal subsampling, so that reframing processing is performed on all frames. In Intermediary mode IM, some or all of the B-frames of a sequence are removed from computation. In Light mode LM, some or all of the P-frames as well as all the B-frames of a sequence are removed from computation. The mode selection is controlled by computing issues, or the available computing environment Cl/Env respectively. This means that according to the context (high/low bit rate or low/high quality) requirements, one of the three modes is selected: high quality means full mode, medium quality means intermediary mode and low quality means light mode.

Figure 5:
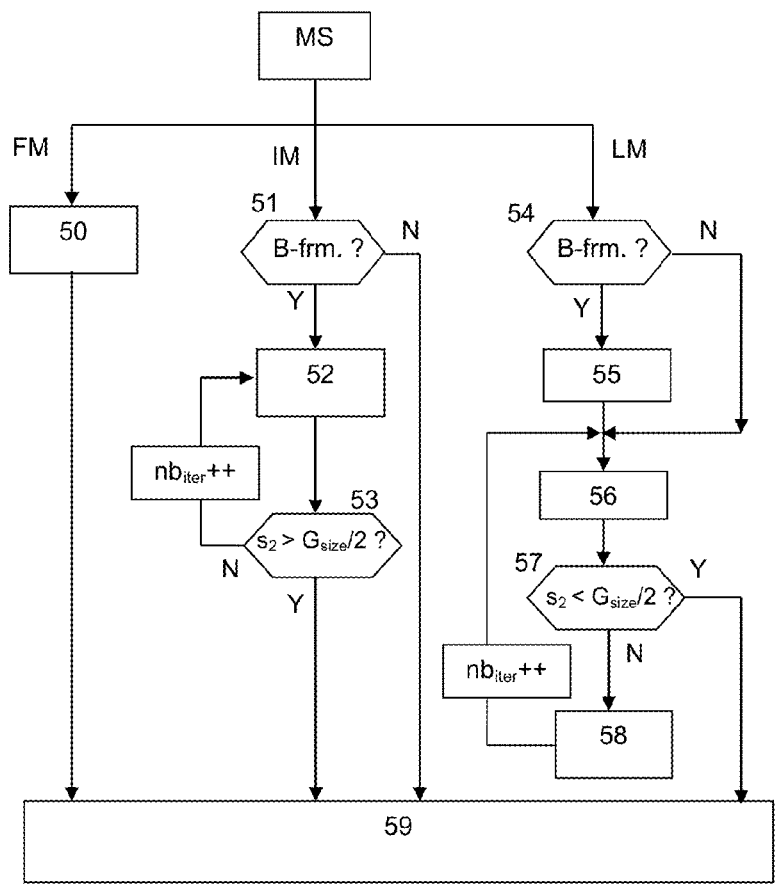

FIG. 5 shows a detailed flow-chart explaining the selection of a mode. Basically, the presence of B-frames is checked, and then their computation is skipped in Intermediary mode IM and Light mode LM. Then, depending on the environment constraints, the P-frames (or a subset) will be discarded as well. As shown in FIG. 5, one of the three possible modes described above can be selected in the mode selection MS.

In Full mode FM, all frames are kept, and in a step 50 the Temporal subsampling factor parameter $s_2$ is set accordingly, e.g. to 1. That is, all frames are processed 59.

In Intermediary mode IM, it is checked 51 if there are any B-frames. If not, all frames are processed 59. If there is at least one B-frame, the next step 52 removes NbB B-frames and calculates the Temporal subsampling factor parameter $s_2$ according to $s_2 = G_{size} - NbB$ (with $G_{size}$ being the GOP size). The calculated Temporal subsampling factor parameter $s_2$ is compared 53 with a given threshold, e.g. according to "$s_2 > G_{size}/2$?". If the Temporal subsampling factor is not below the threshold, the number of B-frames to be removed is increased and the calculation repeated. NbB is a variable that is initialized to 1 and incremented with every execution of the loop. $nb_{iter}$ is a count variable, counting executions of the loop and therefore (in Intermediary mode) also the number of B-frames to be skipped. Alternatively, it is also possible to calculate $s_{2,min} = G_{size} - NbB_{max}$ (with $NbB_{max}$ being the total number of B-frames in the GOP) and add single B-frames back, i.e. decrease $NbB_{max}$ as long as the resulting $s_2$ is below the threshold. Note that in the thresholding step 53 other thresholds $thr_{tSubs}$ can be used for comparison with the Temporal subsampling factor parameter $s_2$, according to "$s_2 > thr_{tSubs}$?". Preferably the threshold is substantially near $G_{size}/2$.

In Light mode LM, it is first checked 54 if there are any B-frames. If so, all B-frames are removed in the next step 55. Then, the obtained Temporal subsampling factor parameter $s_2$ is calculated 56 according to $s_2 = G_{size} - NbB$, and compared 57 with a given threshold, e.g. according to "$s_2 < G_{size}/2$?" (or similar, as in Intermediary mode). If the Temporal subsampling factor parameter $s_2$ is below the threshold, all remaining frames are processed 59. If not, the next step 58 removes NbP P-frames. The resulting Temporal subsampling factor $s_2$ is calculated again 56 according to $s_2 = G_{size} - NbP - NbB$, and compared again 57 with the given threshold. If the Temporal subsampling factor is not yet below the threshold, the number of P-frames to be removed is further increased and the calculation repeated. NbP is a variable that is initialized to 1 and incremented with every execution of the loop. $nb_{iter}$ is a count variable, counting executions of the loop and therefore (in Light mode) also the number of P-frames to be skipped. Alternatively, it is also possible to calculate $s_{2,min} = G_{size} - NbP_{max} - NbB$ (with $NbP_{max}$ being the total number of P-frames in the GOP) and add single P-frames back, i.e. decrease $NbP_{max}$ as long as the resulting $s_2$ is below the threshold.

Finally, all remaining frames are processed 59, including cropping etc.

Figure 6:
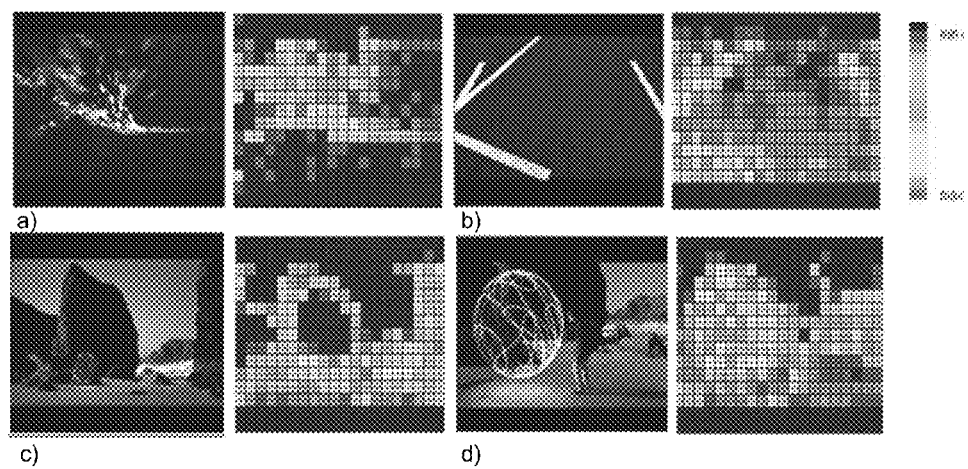

Another parameter is the maximum allowed Zoom factor $s_3$, or pair of Zoom factors ($s_3 = (z_{min}, z_{max})$). For determining the zoom factor $s_3$, in one embodiment the macroblock (MB) cost map is used that corresponds to the first frame of a GOP or scene, which is usually an I-frame. The MB cost map indicates for each MB its coding cost. FIG. 6 shows exemplarily four different MB cost maps for different bit rates and different scenes. Each MB cost map is depicted to the right of the original picture. The most important blocks can clearly be identified (light blocks, which have highest coding cost), and then the minimal and maximal zoom boundaries to be used in the reframing process can be derived from that. In one embodiment of the invention, the zoom factors are re-adjusted at every scene cut. In that case, a scene cut detection is performed before the processing.

The zoom factor z of the cropping window may change over time between the defined Zoom factors according to $z_{min} \leq z \leq z_{max}$. However, one of $z_{min}$, $z_{max}$ may be implicitly or explicitly given.

In one embodiment, $s_3 = (z_{min}, z_{max})$ can be defined according to $$s_3 = \begin{pmatrix} z_{min} = \dfrac{nb_{MBadj}}{nb_{MB}} \\ z_{max} = \dfrac{nb_{MB} - nb_{MBcost0}}{nb_{MB}} \end{pmatrix} \quad \text{(eq. 3)}$$

where $nb_{MB}$ is the total number of MBs within the picture, $nb_{MBcost0}$ is the number of MB with a cost equal to 0 (dark MBs in FIG. 6, e.g. on upper and lower edges), which need not necessarily be adjacent to each other, and $nb_{MBadj}$ is the number of MBs which have a high cost (>max cost/2) and which are spatially adjacent to each other. In one embodiment, it is the largest group of adjacent MBs with a highest cost (>max cost/2) in the picture.

Another parameter is the Bounding box velocity $s_4$. In the same way as the zoom factor, the bounding box velocity may be tuned smartly, particularly if it is tuned on a per-scene basis. In one embodiment, the bounding box velocity is set according to similarity with an adjacent picture, which can be expressed by a correlation coefficient between a current IntraMap and the adjacent picture's IntraMap, where an IntraMap is a map of intra-coded MBs in P- or B-pictures. The more the average correlation coefficient of intra-coded MBs in the adjacent pictures deviates from its average, the lower is the allowed bounding box velocity. The IntraMaps provide information about complexity of the scene, since difficult MBs to be encoded are usually intra-coded. From this information, a value that describes the correlation between consecutive IntraMaps is deduced. It has been found that if the correlation is high (i.e. little or no global motion, little or no local motion), the bounding box velocity should be low in order to fix the window. On the other hand, if the correlation is very low, this probably results from strong camera motion or a strong change of content (e.g. someone moving in front of the camera). In this case, no adaptation is more preferable than a strong adaptation of the bounding box location, which may have no sense in terms of content, and which may be disturbing. Therefore also for low correlation the bounding box velocity should be low. For a medium correlation, the changes in content can easier be handled, and higher velocity can be used to allow a fast re-positioning of the bounding box.

Figure 7:
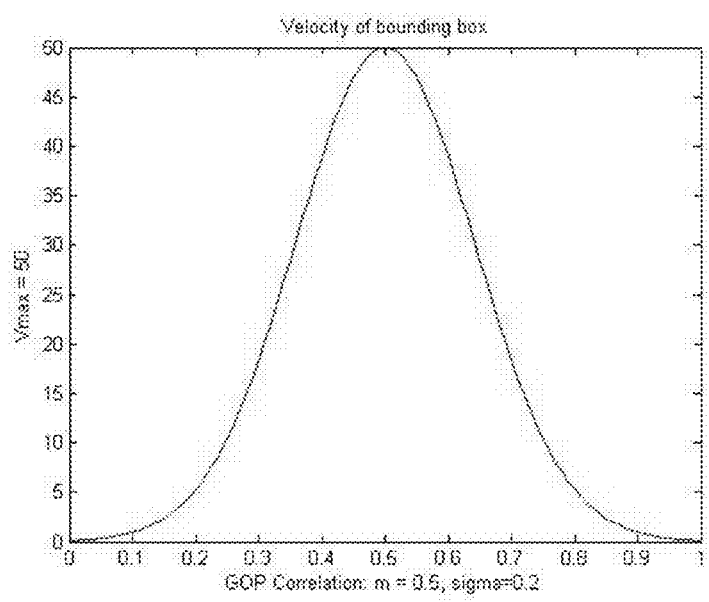

In one embodiment, the Bounding box velocity can be calculated according to $$s_4 = f(\text{GOPsize}, \text{IntraMap}_{GOP}) \quad (eq.4)$$

for example $$s_4 = V_{max} \cdot e^{-\left(\frac{x-m}{\sigma}\right)^2} \quad (eq.\ 5)$$

with $$x = \frac{1}{Gop_{size} - 1} \cdot \sum_{i=1}^{Gop_{size}-1} CC(\text{IntraMap}_i, \text{IntraMap}_{i+1}) \quad (eq.\ 6)$$

where IntraMap is the map of intra-coded MBs in P- or B-pictures, CC is the correlation coefficient between the current IntraMap and an adjacent one (i.e. the next one or previous one), and $V_{max}$ is the maximal allowed velocity of the bounding box. In eq.6, x refers to a current and a previous GOP. Then the bounding box is changing over time as a Gaussian function, as depicted in FIG. 7. m and σ are the mean and the standard deviation, respectively, of the distribution of the velocity. They may be tuned e.g. to m=0.5 and σ=0.2. Note that m, σ and $V_{max}$ are fixed parameters defined as maximum values in the system. As described above, maximum bounding box velocity is allowed when the correlation has a medium value.

Figure 8:
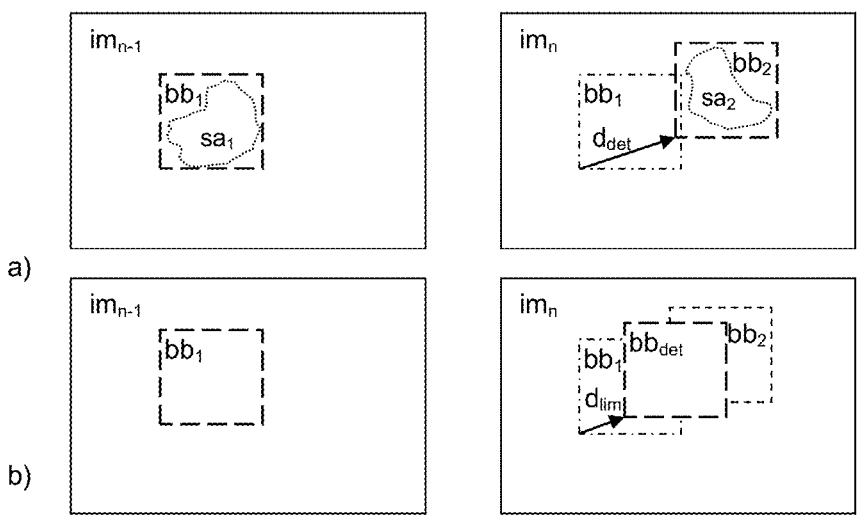

FIG. 8 shows, exemplarily and in a simplified manner, a limitation of the bounding box velocity. Note that the depicted scale may be unrealistic, and has just been used for clarification. In a previous image $im_{n-1}$ a first bounding box $bb_1$ around a most salient area $sa_1$ is determined, and in a current image $im_n$ a second bounding box $bb_2$ around a most salient area $sa_e$ is determined, as described above. Then, a shift vector or shift distance $d_{det}$ between the first and second bounding boxes is determined, and compared with a maximum allowed shift vector or shift distance $d_{max}$.

Alternatively, when considering the temporal distance (using the frame rate f) between the images $im_{n-1}$, $im_n$, a determined actual bounding box velocity can be calculated according to $v_{det} = d_{det} * f$. The determined actual bounding box velocity is compared with a maximum allowed bounding box velocity $v_{max}$.

Figure 9:
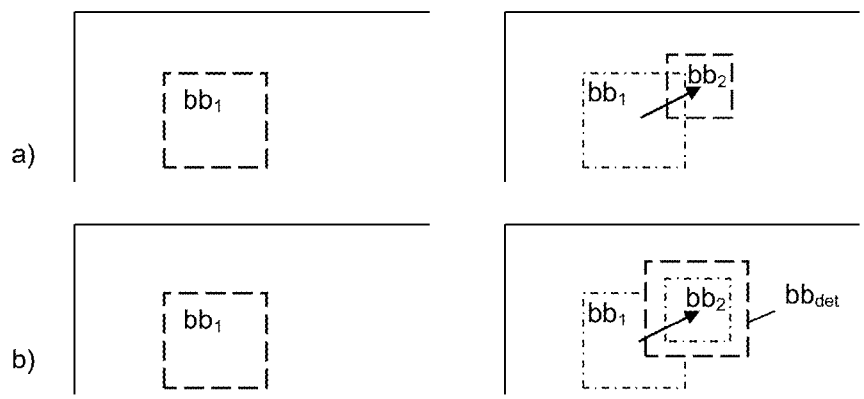

If the determined bounding box shift vector $d_{det}$ is above (i.e. longer than) the maximum allowed bounding box shift vector $d_{max}$, or if the determined bounding box velocity $v_{det}$ is above the maximum allowed bounding box velocity $v_{max}$, then a position and/or size of a new bounding box is determined, and the sub-area according to the determined new bounding box position is cropped in the current image for being displayed (i.e. only the portion of the image that is identified by the bounding box is displayed). Otherwise, if the determined bounding box shift vector $d_{det}$ is not above the maximum allowed bounding box shift vector $d_{max}$ or if the determined bounding box velocity $v_{det}$ is not above the maximum allowed bounding box velocity $v_{max}$, then the second bounding box can be used as it is. Similarly, the zoom factor can be explained. FIG. 9 shows, exemplarily and in a simplified manner, a limitation of the bounding box zoom factor. Note that the depicted scale may be unrealistic. In a previous image $im_{n-1}$ a first bounding box $bb_1$ around a most salient area is determined, and in a current image $im_n$ a second bounding box $bb_2$ around a most salient area is determined, as described above. In this example, the second bounding box $bb_2$ is considerably smaller than the first bounding box $bb_1$. Then, a zoom factor is calculated. In principle, the zoom factor may be calculated from the number of pixels with the bounding boxes, e.g. according to $z = n_{bb2}/n_{bb1}$. The calculated zoom factor is compared with a maximum allowed zoom factor $z_{max}$.

If the determined zoom factor $z_{det}$ is not above the maximum allowed zoom factor $z_{max}$, the second bounding box can be used as it is. Otherwise, if the determined zoom factor $z_{det}$ is above the maximum allowed zoom factor $z_{max}$, then a size of a new bounding box $bb_{det}$ is determined such that the maximum allowed zoom factor $z_{max}$ is met. The new bounding box $bb_{det}$ is concentric with the second bounding box $bb_2$. The sub-area according to the determined new bounding box $bb_{det}$ position is cropped in the current image for being displayed.

It is to be noted that the above with respect to FIG. 8 and FIG. 9 is an explanation of the principle of the bounding box concept. In real implementations, e.g. for bounding box velocity, a filter (e.g. Kalman filter) is applied to the bounding box coordinates, and the bounding box velocity is a noise factor that is injected in the filter in order to smooth the trajectory of the bounding box coordinates and the bounding box size.

Bounding box (or cropping window) refers to the sub-area or sub-set of pixels that are selected, in one embodiment, as being the most salient to be included in a window. In one embodiment, this window is set to a targeted pre-defined aspect ratio (e.g. defined by the user). Then, in one embodiment, in the reframing application the window varies in location (x and y axis) and/or in size. The velocity refers only to the position of the box, i.e. the way the bounding box changes its location over time. Therefore it is influenced e.g. by camera motion. Practically, the bounding box velocity can be considered as the velocity at which the visible portion of the frames moves.

Figure 10:
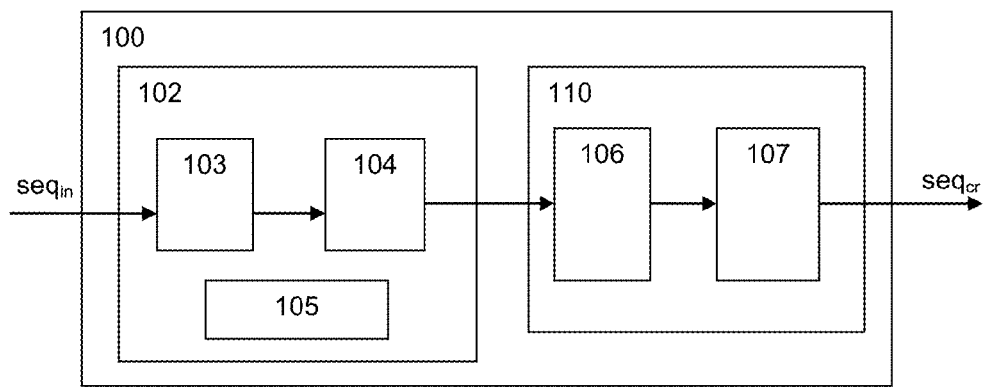

FIG. 10 shows a principle block diagram of an apparatus 100 for processing images of an input video sequence $seq_{in}$ according to the invention. The apparatus comprises an image analysis module 102 and an image processing module 110. The image analysis module comprises a first parameter determining module 103 for determining parameters of the video sequence, a second parameter determining module 104 for determining parameters of a previously decoded GOP of the video sequence, and a user interface module 105 for determining user settings. Further, the apparatus comprises a crop window positioning module 106 for determining a portion to be cropped according to the determined parameters, and a cropping module 107 for cropping the determined portion for being displayed. A sequence of cropped images $seq_{cr}$ is provided on the output. Various parameters of the video sequence can be determined and utilized separately or combined, as described above. The above-mentioned modules can be implemented either as hardware modules, as software-supported hardware modules, or as software modules.

In one embodiment, the apparatus further comprises a scene detection module. Where the subsequence is a scene, the scene is detected by the scene detection module.

In one embodiment, the apparatus further comprises at least one of: means for determining in a previous image ($im_{n-1}$) a sub-area or sub-set of pixels ($sa_1$) being the most salient portion of the previous image, means for determining a first bounding box ($bb_1$) around said sub-area or sub-set of pixels of the previous image, means for determining in the current image ($im_n$) a sub-area or sub-set of pixels ($sa_2$) being the most salient portion of the current image, means for determining a second bounding box ($bb_1$) around said area of the current image, means for calculating from positions of the first bounding box ($bb_1$) and the second bounding box ($bb_2$) a bounding box shift ($d_{det}$), or calculating from positions of the first bounding box ($bb_1$) and the second bounding box ($bb_2$) and the video frame rate a bounding box velocity, means for comparing the determined bounding box shift ($d_{det}$) or bounding box velocity with a maximum allowed bounding box shift or bounding box velocity between successive images, and means for determining a position and/or size of a new bounding box ($bb_{det}$) and cropping in the current image the sub-area according to the determined new bounding box for being displayed, if the determined bounding box shift is above the maximum allowed bounding box shift, or if the determined bounding box velocity is above the maximum allowed bounding box velocity, and for otherwise, if the determined bounding box shift ($d_{det}$) or bounding box velocity is at or below the maximum allowed bounding box shift or bounding box velocity, cropping in the current image the sub-area according to the determined second bounding box ($bb_2$) for being displayed.

An advantage of the present invention is that it performs automatic tuning of reframing parameters, based on reliable and useful decoding information of the content. That is, the reframing parameters are tuned automatically based on the content by using information available when decoding the video (in particular, properties of the previously decoded sequence). Conventionally encoded video sequences can be used, since no additional information needs to be inserted during encoding. Some settings S of the reframing application can be tuned automatically from the decoding process or decoded stream. These parameters are one or more of: the buffer size $s_1$, a temporal subsampling factor $s_2$, the zoom factors $s_3=(z_{min}, z_{max})$ and the bounding box velocity $s_4$, as described above.

In one embodiment, settings or input parameters for a decoded video sequence are automatically tuned according to properties of its immediate preceding decoded sequence.

In one embodiment of the present invention, the reframing application is performed after video decoding.

The invention can be implemented in devices capable of displaying video, or devices for pre-processing video for being displayed. The invention is particularly useful for video displaying devices with a small screen size.

It will be understood that the present invention has been described purely by way of example, and modifications of detail can be made without departing from the scope of the invention. While there has been shown, described, and pointed out fundamental novel features of the present invention as applied to preferred embodiments thereof, it will be understood that various omissions and substitutions and changes in the apparatus and method described, in the form and details of the devices disclosed, and in their operation, may be made by those skilled in the art, without departing from the spirit of the present invention. It is expressly intended that all combinations of those elements that perform substantially the same function in substantially the same way to achieve the same results are within the scope of the invention. Substitutions of elements from one described embodiment to another are also fully intended and contemplated.

Each feature disclosed in the description and (where appropriate) the claims and drawings may be provided independently or in any appropriate combination. Features may, where appropriate be implemented in hardware, software, or a combination of the two. Reference numerals appearing in the claims are by way of illustration only and shall have no limiting effect on the scope of the claims.

What is claimed is:

1. A method for processing images of a video sequence, comprising steps of
    determining parameters of the video sequence, parameters of a previously decoded subsequence of the video sequence and user settings;
    determining a portion to be cropped according to the determined parameters; and
    cropping in a reframing step the determined portion for being displayed, wherein a Temporal Subsampling factor or a Temporal Subsampling scheme is set according to a temporal subsampling mode, wherein in a first subsampling mode the reframing step is applied to all frames, and in a second subsampling mode the reframing step is applied to all I-frames and P-frames and is not applied to zero or more B-frames, and in a third subsampling mode the reframing step is applied to all I-frames and is not applied to any B-frame and not applied to zero or more P-frames.

2. The method according to claim 1, wherein said subsequence is a Group-of-Pictures or a scene, the scene being detected by scene detection.

3. The method according to claim 1, wherein parameters of the video sequence or parameters of a previously decoded subsequence comprise at least one of a Group-of-Pictures size, a scene length, a temporal subsampling factor, minimum and maximum zoom factors and a bounding box velocity.

4. The method according to claim 1, wherein said determining parameters of the video sequence comprises, for a current image,
    determining in a previous image a sub-area or sub-set of pixels being the most salient portion of the previous image;
    determining a first bounding box around said sub-area or sub-set of pixels of the previous image;
    determining in the current image a sub-area or sub-set of pixels being the most salient portion of the current image;
    determining a second bounding box around said area of the current image;
    calculating from positions of the first bounding box and the second bounding box a bounding box shift, or calculating from positions of the first bounding box and the second bounding box and the video frame rate a bounding box velocity;
    comparing the determined bounding box shift or bounding box velocity with a maximum allowed bounding box shift or bounding box velocity between successive images; and
    if the determined bounding box shift is above the maximum allowed bounding box shift, or if the determined bounding box velocity is above the maximum allowed bounding box velocity, then determining at least one of a position and a size of a new bounding box and cropping in the current image the sub-area according to the determined new bounding box for being displayed;
    otherwise, if the determined bounding box shift or bounding box velocity is at or below the maximum allowed bounding box shift or bounding box velocity, cropping in the current image the sub-area according to the determined second bounding box for being displayed.

5. The method according to claim 4, wherein the maximum allowed bounding box shift or bounding box velocity is determined from parameters of a previously decoded subsequence of the video sequence.

6. The method according to claim 1, wherein said determining a bounding box velocity is calculated according to $$s_4 = V_{max} \cdot e^{-(\frac{x-m}{\sigma})^2}$$

with $$x = \frac{1}{Gop_{size} - 1} \cdot \sum_{i=1}^{Gop_{size}-1} CC(IntraMap_i, IntraMap_{i+1})$$

wherein IntraMap is a map of intra-coded MBs in P- or B-pictures, CC is a correlation coefficient between a current IntraMap and an adjacent IntraMap, and $V_{max}$ is the maximal velocity of the bounding box, and m and $\sigma$ are mean and standard deviation of a distribution of the bounding box velocity.

7. Method according to claim 1, further comprising a step of smoothing the cropping window parameters over time, wherein a buffer is used in the reframing step to smooth the cropping window parameters over time, and wherein the buffer size $s_1$ is adjusted according to the Group-of-Pictures size.

8. Method according to claim 1, wherein one of the subsampling modes is selected according to at least one of bitrate requirements and image quality requirements.

9. Method according to claim 1, wherein the portion to be cropped is defined by a cropping window, further comprising a step of determining a maximum or minimum allowed zoom factor or a pair of zoom factors, the maximum or minimum allowed zoom factor defining a boundary up to which the cropping window may change over time, or the pair of zoom factors defining two boundaries between which the cropping window may change over time.

10. Method according to claim 9, wherein the zoom factor or pair of zoom factors is calculated from parameters of a macroblock cost map of a first frame of a current Group-of-Pictures or scene.

11. Method according to claim 10, wherein a minimum allowed zoom factor is calculated according to $$z_{min} = \frac{nb_{MBadj}}{nb_{MB}}$$

and a maximum allowed zoom factor is calculated according to $$z_{max} = \frac{nb_{MB} - nb_{MBcost0}}{nb_{MB}},$$

wherein $nb_{MB}$ is the total number of MBs within the image, $nb_{MBcost0}$ is the number of macroblocks with a cost equal to 0, $nb_{MBadj}$ is the number of adjacent macroblocks with a highest cost.

12. An apparatus for processing images of a video sequence, comprising
 image analysis means for determining parameters of the video sequence, determining parameters of a previously decoded Group-of-Pictures of the video sequence and determining user settings; and
 image processing means for determining a portion to be cropped according to the determined parameters, and for cropping the determined portion for being displayed, wherein a Temporal Subsampling factor or a Temporal Subsampling scheme is set according to a temporal subsampling mode, and wherein the image processing means determines the portion to be cropped: in a first subsampling mode for all frames, and in a second subsampling mode for all I-frames and P-frames and not for zero or more B-frames, and in a third subsampling mode for all I-frames and not for any B-frame and not for zero or more P-frames.

13. The apparatus according to claim 12, further comprising a scene detection module, wherein said subsequence is a Group-of-Pictures or a scene, the scene being detected by the scene detection module.

14. The apparatus according to claim 12, further comprising
 means for determining in a previous image a sub-area or sub-set of pixels being the most salient portion of the previous image;
 means for determining a first bounding box around said sub-area or sub-set of pixels of the previous image;
 means for determining in the current image a sub-area or sub-set of pixels being the most salient portion of the current image;
 means for determining a second bounding box around said area of the current image;
 means for calculating from positions of the first bounding box and the second bounding box a bounding box shift, or calculating from positions of the first bounding box and the second bounding box and the video frame rate a bounding box velocity;
 means for comparing the determined bounding box shift or bounding box velocity with a maximum allowed bounding box shift or bounding box velocity between successive images; and
 means for determining at least one of a position and a size of a new bounding box and cropping in the current image the sub-area according to the determined new bounding box for being displayed, if the determined bounding box shift is above the maximum allowed bounding box shift, or if the determined bounding box velocity is above the maximum allowed bounding box velocity, and for otherwise, if the determined bounding box shift or bounding box velocity is at or below the maximum allowed bounding box shift or bounding box velocity, cropping in the current image the sub-area according to the determined second bounding box for being displayed.

15. A non-transitory computer readable storage medium having executable instructions stored thereon to cause a computer to perform a method for processing images of a video sequence, the method comprising steps of
 determining parameters of the video sequence, parameters of a previously decoded subsequence of the video sequence and user settings;
 determining a portion to be cropped according to the determined parameters; and
 cropping in a reframing step the determined portion for being displayed, wherein a Temporal Subsampling factor or a Temporal Subsampling scheme is set according to a temporal subsampling mode, wherein in a first subsampling mode the reframing step is applied to all frames, and in a second subsampling mode the reframing step is applied to all I-frames and P-frames and is not applied to zero or more B-frames, and in a third subsampling mode the reframing step is applied to all I-frames and is not applied to any B-frame and not applied to zero or more P-frames.

16. The non-transitory computer readable storage medium according to claim 15, wherein parameters of the video sequence or parameters of a previously decoded subsequence comprise at least one of a Group-of-Pictures size, a scene length, a temporal subsampling factor, minimum and maximum zoom factors and a bounding box velocity.

17. The non-transitory computer readable storage medium according to claim 15, wherein said determining parameters of the video sequence comprises, for a current image, determining in a previous image a sub-area or sub-set of pixels being the most salient portion of the previous image;

determining a first bounding box around said sub-area or sub-set of pixels of the previous image;

determining in the current image a sub-area or sub-set of pixels being the most salient portion of the current image;

determining a second bounding box around said area of the current image;

calculating from positions of the first bounding box and the second bounding box a bounding box shift, or calculating from positions of the first bounding box and the second bounding box and the video frame rate a bounding box velocity;

comparing the determined bounding box shift or bounding box velocity with a maximum allowed bounding box shift or bounding box velocity between successive images; and if the determined bounding box shift is above the maximum allowed bounding box shift, or if the determined bounding box velocity is above the maximum allowed bounding box velocity, then determining at least one of a position and a size of a new bounding box and cropping in the current image the sub-area according to the determined new bounding box for being displayed;

otherwise, if the determined bounding box shift or bounding box velocity is at or below the maximum allowed bounding box shift or bounding box velocity, cropping in the current image the sub-area according to the determined second bounding box for being displayed.

18. The non-transitory computer readable storage medium according to claim 17, wherein the maximum allowed bounding box shift or bounding box velocity is determined from parameters of a previously decoded subsequence of the video sequence.

19. The non-transitory computer readable storage medium according to claim 15, wherein the portion to be cropped is defined by a cropping window, further comprising a step of determining a maximum or minimum allowed zoom factor or a pair of zoom factors, the maximum or minimum allowed zoom factor defining a boundary up to which the cropping window may change over time, or the pair of zoom factors defining two boundaries between which the cropping window may change over time.

* * * * *